March 10, 1931.  A. D. KENNEDY  1,795,779
BANANA HANGER
Filed March 5, 1927
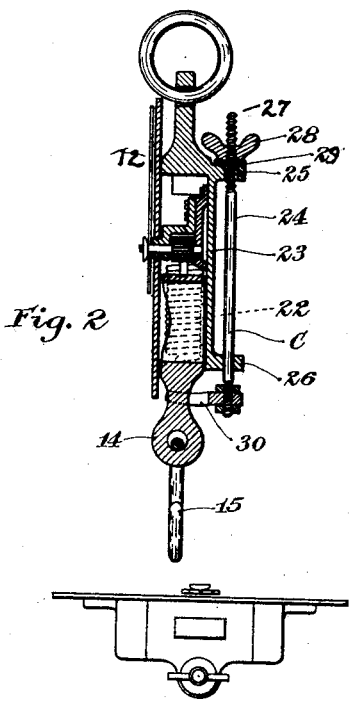
Fig. 2
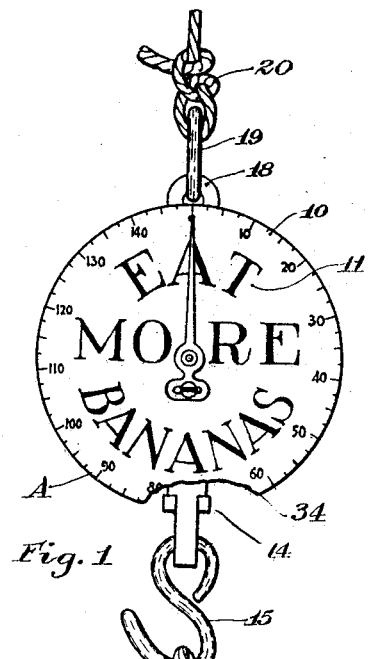
Fig. 1
Fig. 3
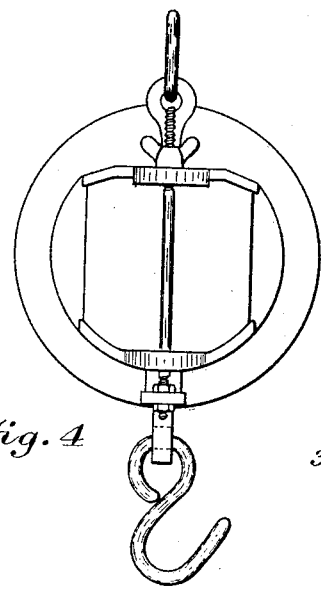
Fig. 4
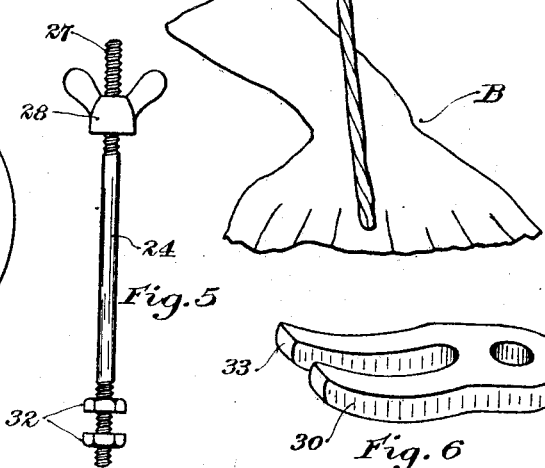
Fig. 5
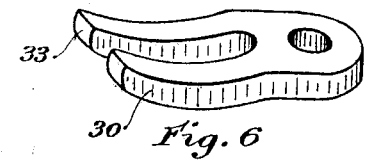
Fig. 6
Inventor
Alois D. Kennedy
By Howard Peek
Attorney Patented Mar. 10, 1931

1,795,779

UNITED STATES PATENT OFFICE

ALOIS D. KENNEDY, OF ST. PAUL, MINNESOTA

BANANA HANGER

Application filed March 5, 1927. Serial No. 172,996.

My invention relates to means adapted to provide a holder particularly designed for a bunch of bananas to be held in a display in a grocery store or in other stores where they have a bunch of bananas hung up for sale and display.

A feature of the invention resides in means for permitting the purchaser of the bunch of bananas to determine quickly and without unnecessary effort the weight of the entire bunch of bananas when the same is purchased. Bananas are purchased by the grocers or those who sell them, by weight, that is, the whole bunch of bananas are sold to weigh a certain amount. After they are hung up for sale in the stores the grocer has no means of determining the weight of the entire bunch of bananas without materially inconveniencing him, in fact, the only means of weighing them is to place them on a scale and owing to their bulky nature it is difficult to do this unless one has a particular scale made for that special purpose.

My invention overcomes these difficulties by providing a display hanger having a scale means included therein for supporting the entire bunch of bananas in a manner so that the purchaser can release the scale readily and weigh the bananas after which the scale is relieved of the weight, yet remaining as a part of the supporting means for holding up the bunch of bananas on display.

These features and objects, together with other details of my invention will be more fully and clearly set forth in the specification and drawings forming part of this specification:

Figure 1 is a front view of my banana supporting means showing a portion of a bunch of bananas attached thereto.

Figure 2 is a sectional central view through a portion of the supporting means and scale to show the relation of the operating parts.

Figure 3 is a plan view of the banana supporting means and scale.

Figure 4 is a back view of the same.

Figure 5 is a detail of a portion of the same.

Figure 6 illustrates another detail of a portion of the same.

In the drawings my banana display supporting means A is provided with a scale member 10 upon the side of which the graduations 11 to indicate the number of pounds are indicated, while the indicating hand 12 is adapted to be operated to indicate the weight of the bananas supported by my display device A.

The scale member 10 of my display is provided with a depending member 14 from which a hook 15 depends and by means of a cord 16 the bunch of bananas B may be readily supported to the display A.

The upper end of my banana supporting and display device A is provided with an eye portion 18 through which the ring 19 extends and by means of a suitable cord or cable member 20 the upper end of the display A is supported to the ceiling or from any convenient supporting means to hold the display with the bunch of bananas B on display in the store so that the bananas can be readily cut off of the stalk when they are sold.

The scale member 10 of my display is provided with suitable spring members 22 within the casing 23 of the same which are adapted to operate in the ordinary well known manner with the member 14 to weigh the bunch of bananas B when the scale parts are in operative position. It is not desirable to have the scale free to operate continually as it supports the bunch of bananas B and I have therefore provided the releasing means C on the back or otherwise associated with the scale member 10 which is adapted to relieve the weight of the bunch of bananas B from the scale weighing mechanism, including the coil springs 22. This releasing means C includes the bolt member 24 which extends freely through the lug 25 positioned near the upper portion of the scale member 10 and the lug 26 positioned near the lower end. The operating rod 24 is threaded with a large quick acting thread 27 and is adapted to be operated by the wing nut member 28 which bears against the thrust bearing 29 which may be of ordinary well known construction having a series of ball members included in the same so that when the wing nut 28 is operated the same may be readily rotated to permit the easy drawing up of the bolt member 24 in a manner to raise the same.

The lower end of the bolt member 24 is adapted to support a hook member 30 between the nuts 32 which are adapted to hold the hook member rigidly supported to the lower end of the bolt member 24. The hook member is adapted to engage on either side of the depending member 14 with the bifurcated end 33 of the hook member 30 engaging against the shoulders 34 on the member 14 so that when the bolt member 24 is raised by the wing nut 28 the hook member 30 will raise the member 14 in a manner to take the weight off of the springs 22 of the scale 10. In this manner the weight of the bunch of bananas B may be carried by the bolt member 24 when the bananas are held ordinarily on display.

When the grocer purchases a new bunch of bananas they are hung on the hook member 15 and the bolt member 24 is released by releasing the wing nut 28 sufficiently to permit the scale 10 to indicate the proper weight of the bunch of bananas B. Thus the purchaser of the bunch of bananas can determine very quickly whether or not he is being charged for the correct weight of the bunch of bananas as a whole, and this is very important as often the grocer buys bananas and he does not know whether he is being charged for the correct weight of the same or not. By my display and weighing means this is readily determined.

After the weight is determined the wing nut is operated to lift the weight of the bunch of bananas B off of the scale mechanism and particularly the spring 22 so that no strain is on the scale mechanism when the bananas hang ordinarily on display.

The nut members 32 permit the hook member 30 to be properly adjusted so that the lifting means C can be adjusted to the scale and to the display device A in the proper manner. When once in the correct position the hook 30 is locked by the nuts 32 to the lower end of the rod 24.

In accordance with the patent statutes I have described the principles of my invention and while I have indicated a particular means and construction of my banana display device I desire to have it understood that the same is only suggestive and that the invention may be carried out by other means and applied to uses other than those set forth within the scope of the following claims without departing from the spirit of my invention.

I claim:

1. A banana display device including, means for supporting a bunch of bananas suspended below said display, a weighing scale interposed in said supporting means and adjustable means holding the mechanism of the scale entirely inoperative and supporting the weight of the bunch of bananas off of the scale weighing mechanism.

2. A support and display for a bunch of bananas including a receiving end upon which the bunch of bananas are adapted to be hung, a scale for weighing the bunch of bananas, and adjustable means for holding the weighing scale mechanism entirely out of operation and to support the load of the bunch of bananas through said means for holding the scale weighing mechanism inoperative.

3. A banana display supporting device including, a scale member for weighing the bananas in a bunch having a rotating indicator pointer, means associated with said scale adapted to hold the weighing mechanism thereof entirely out of operation and to support the load of the bunch of bananas by said scale relieving means.

4. A support for a bunch of bananas comprising a weighing mechanism adapted to indicate the weight of the bunch of bananas when in operation, a balance arm and means for holding the scale weighing mechanism out of operation including a member adapted to engage said balance arm which supports the bunch of bananas, a rod for holding said member against movement, and means for adjustably supporting said rod from said weighing mechanism.

5. A banana supporting and display means comprising, a member adapted to support a bunch of bananas to hold the same in display position, a scale mechanism with an indicating face and a balance supporting member, an adjustable rod member upon said scale mechanism including a hook member adapted to engage the balance supporting member of said scale mechanism to hold the same adjustably out of operating position and to release the same into operative position.

6. A banana supporting and display device including, a scale weighing mechanism, an adjustable rod mounted upon said weighing mechanism and having a bifurcated member on one end adapted to engage the weighing mechanism of said scale, a thread formed on the other end of said rod, a thrust bearing and an adjusting nut on said threaded end to permit the rod to be readily adjusted to weigh a bunch of bananas and to relieve said scale mechanism by supporting the load of the weight of the bunch of bananas through said rod and connecting parts.

7. A display and support for a bunch of bananas including, a scale, a weighing and indicating mechanism in said scale, an advertising display face on said scale, means for supporting said scale to the ceiling, a hook member on said scale for receiving the cord adapted to support a bunch of bananas, a rod member mounted upon said scale, means for holding said hook member adjustable on one end of said rod member, a thread formed on the other end of said rod, and an adjusting nut on the threaded end adapted to operate said rod in a manner to transmit the load of a bunch of bananas through said rod and off of said scale weighing means.

8. A device for displaying and weighing a bunch of bananas comprising, a scale mechanism interposed between supporting means for holding a bunch of bananas elevated, means for normally supporting the weight of the bunch of bananas, an adjustable member in said supporting means, and means for releasably holding said adjustable member to cause the weight of the bananas to be indicated on the scale mechanism when said holding means is released.

ALOIS D. KENNEDY.